United States Patent [19]

Hyuga et al.

[11] Patent Number: 5,333,145
[45] Date of Patent: Jul. 26, 1994

[54] SOLID LASER

[75] Inventors: Hiroaki Hyuga; Chiaki Goto, both of Kanagawa, Japan

[73] Assignee: Fuji Photo Film Co., Ltd., Kanagawa, Japan

[21] Appl. No.: 109,443

[22] Filed: Aug. 20, 1993

[30] Foreign Application Priority Data

Aug. 20, 1992 [JP] Japan .................................. 4-221722

[51] Int. Cl.$^5$ .............................................. H01S 3/09
[52] U.S. Cl. ........................................ 372/69; 372/71
[58] Field of Search ........................ 372/41, 69, 70, 71

[56] References Cited

U.S. PATENT DOCUMENTS

| | | | |
|---|---|---|---|
| 3,786,368 | 1/1974 | Bjorkholm et al. | 372/70 |
| 5,124,999 | 6/1992 | Okazaki et al. | 372/71 |
| 5,260,963 | 11/1993 | Baird et al. | 372/41 |
| 5,285,460 | 2/1994 | Ueda et al. | 372/41 |

FOREIGN PATENT DOCUMENTS 62-189783  8/1987  Japan .

OTHER PUBLICATIONS

"Efficient GaAlAs diode-laser-pumped operation of Nd:YLF at 1.047 μm with intracavity doubling to 523.6 nm," T. Y. Fan et al, Optics Letters, vol. 11 No. 4, Apr. 1986.

Primary Examiner—Rodney B. Bovernick
Assistant Examiner—Robert E. Wise
Attorney, Agent, or Firm—Sughrue, Mion, Zinn, Macpeak & Seas

[57]  ABSTRACT

A solid laser comprises an anisotropic laser crystal, to which a rare earth element has been added, a pumping device, which causes a pumping beam to impinge upon the laser crystal, and a resonator mirror, which oscillates a solid laser beam having been produced by the laser crystal. The laser crystal is located in an orientation such that its crystallographic axis may makes an angle with respect to a laser oscillation axis. A device linearly moves the pumping means with respect to the laser crystal and the resonator mirror such that only either one of ordinary rays and extraordinary rays, which are produced by the laser crystal, may oscillate selectively, or a device linearly moves the resonator mirror with respect to the laser crystal and the pumping means such that only either one of ordinary rays and extraordinary rays, which are produced by the laser crystal, may oscillate selectively. A single desired beam radiation line is thus selected easily.

6 Claims, 2 Drawing Sheets

SOLID LASER

BACKGROUND OF THE INVENTION

1. Field of the Invention

This invention relates to a solid laser. This invention particularly relates to a solid laser, wherein an anisotropic laser crystal is employed as a laser medium, and either one of two laser beams having different directions of polarization and different wavelengths is selectively radiated out of the solid laser.

2. Description of the Prior Art

Solid lasers have been proposed in, for example, Japanese Unexamined Patent Publication No. 62(1987)-189783. The proposed solid lasers comprise a laser crystal, to which a rare earth element, such as neodymium (Nd), has been added. The laser crystal is pumped by a semiconductor laser, or the like. Basically, the solid laser comprises the laser crystal, a pumping means, which causes a pumping beam to impinge upon the laser crystal, and a resonator mirror, which oscillates a solid laser beam having been produced by the laser crystal.

In solid lasers of this type, anisotropic crystals, such as $LiYF_4$ (hereinafter referred to as YLF), are often employed as laser crystals. In such cases, in general, two beam radiation lines occur in a single oscillation wavelength band. For example, in cases where Nd-doped YLF (hereinafter referred to as Nd:YLF) is employed as the laser crystal, a laser beam having a wavelength of 1,053 nm, which is the so-called $\sigma$-polarized light, and a laser beam having a wavelength of 1,047 nm, which is the so-called $\pi$-polarized light, can be radiated out of the solid laser in an oscillation wavelength band of 1.0 $\mu$m. Also, in an oscillation wavelength band of 1.3 $\mu$m, a beam radiation line, in which a laser beam having a wavelength of 1,313 nm ($\sigma$-polarized light) is radiated out of the solid laser, and a beam radiation line, in which a laser beam having a wavelength of 1,321 nm ($\pi$-polarized light) is radiated out of the solid laser, can occur. This is because ordinary rays oscillate in one of the two beam radiation lines, and extraordinary rays oscillate in the other beam radiation line.

Therefore, in cases where an anisotropic laser crystal is employed as the laser crystal, in general, it is necessary for a countermeasure to be devised such that a single desired beam radiation line may be obtained. For example, such a technique is described in Optics Letters, Vol. 11, No. 4, April 1986. With the described technique, a Brewster plate is inserted into a resonator for a solid laser, in which an anisotropic laser crystal is employed. The Brewster plate is rotated 90°, and one of two beam radiation lines is thereby selected.

However, the conventional solid laser utilizing the Brewster plate has the problems in that a laser beam cannot be radiated with a high efficiency out of the solid laser due to large loss occurring from the insertion of the Brewster plate into the resonator.

Also, with the conventional solid laser utilizing the Brewster plate, a complicated mechanism is required to rotate the Brewster plate, and re-adjustments for the resonator mirror must be carried out as the Brewster plate is rotated. Therefore, the conventional solid laser utilizing the Brewster plate has the drawbacks in that the structure cannot be kept simple, and adjustments cannot be carried out easily.

SUMMARY OF THE INVENTION

The primary object of the present invention is to provide a solid laser, in which an anisotropic laser crystal is employed as a laser crystal and a single desired beam radiation line is capable of being obtained easily, and which has a simple structure.

Another object of the present invention is to provide a solid laser, which is capable of radiating a laser beam with a high efficiency.

The present invention provides a first solid laser comprising:
i) an anisotropic laser crystal, to which a rare earth element has been added,
ii) a pumping means, which causes a pumping beam to impinge upon the laser crystal, and
iii) a resonator mirror, which oscillates a solid laser beam having been produced by the laser crystal, wherein the laser crystal is located in an orientation such that a crystallographic axis thereof may makes an angle with respect to a laser oscillation axis, and a means is provided which linearly moves the pumping means with respect to the laser crystal and the resonator mirror such that only either one of ordinary rays and extraordinary rays, which are produced by the laser crystal, may oscillate selectively.

The present invention also provides a second solid laser comprising:
i) an anisotropic laser crystal, to which a rare earth element has been added,
ii) a pumping means, which causes a pumping beam to impinge upon the laser crystal, and
iii) a resonator mirror, which oscillates a solid laser beam having been produced by the laser crystal, wherein the laser crystal is located in an orientation such that a crystallographic axis thereof may makes an angle with respect to a laser oscillation axis, and a means is provided which linearly moves the resonator mirror with respect to the laser crystal and the pumping means such that only either one of ordinary rays and extraordinary rays, which are produced by the laser crystal, may oscillate selectively.

In the first and second solid lasers in accordance with the present invention, the rare earth element may be, for example, neodymium.

As will be understood from the specification, it should be noted that the term "moving a pumping means with respect to a laser crystal and a resonator mirror" as used herein means movement of the pumping means relative to the laser crystal and the resonator mirror, and embraces both the cases wherein the pumping means is moved while the laser crystal and the resonator mirror are kept stationary, and cases wherein the laser crystal and the resonator mirror are moved while the pumping means is kept stationary.

Also, it should be noted that the term "moving a resonator mirror with respect to a laser crystal and a pumping means" as used herein means movement of the resonator mirror relative to the laser crystal and the pumping means, and embraces both the cases wherein the resonator mirror is moved while the laser crystal and the pumping means are kept stationary, and cases wherein the laser crystal and the pumping means are moved while the resonator mirror is kept stationary.

With the first and second solid lasers in accordance with the present invention, the laser crystal is located in an orientation such that a crystallographic axis of the laser crystal may makes an angle with respect to the laser oscillation axis. Therefore, the solid laser beam, which has been produced by the laser crystal, is constituted of ordinary rays and extraordinary rays due to birefringence properties of the laser crystal. The ordinary rays and the extraordinary rays have different wavelengths, e.g. 1.313 μm and 1.321 μm in cases where the Nd:YLF crystal is employed. Accordingly, when the position of the pumping means with respect to the positions of the laser crystal and the resonator mirror is changed in the first solid laser in accordance with the present invention, or when the position of the resonator mirror with respect to the positions of the laser crystal and the pumping means is changed in the second solid laser in accordance with the present invention, the optical path between mirrors of the resonator changes. As a result, either one of the state, in which the ordinary rays oscillate, and the state, in which the extraordinary rays oscillate, can be generated selectively.

With the first and second solid lasers in accordance with the present invention, in the manner described above, either one of the two beam radiation lines (and the corresponding direction of polarization) can be obtained selectively. For this purpose, the first and second solid lasers in accordance with the present invention are provided with the means for linearly moving the pumping means with respect to the laser crystal and the resonator mirror, or the means for linearly moving the resonator mirror with respect to the laser crystal and the pumping means. The mechanisms of these means are simpler than the mechanism of the means for rotating a Brewster plate. Therefore, with the first and second solid lasers in accordance with the present invention, the structure can be kept simpler, the cost can be kept lower, and adjustments can be carried out more easily than the conventional solid laser, wherein the Brewster plate is rotated and a beam radiation line is thereby selected.

Further, with the first and second solid lasers in accordance with the present invention, additional elements, such as a Brewster plate, are not inserted into the resonator in order to select a desired beam radiation line. Therefore, any loss due to insertion of such additional elements into the resonator does not occur, and a laser beam can be radiated with a high efficiency out of the solid laser.

DESCRIPTION OF THE PREFERRED EMBODIMENTS

The present invention will hereinbelow be described in further detail with reference to the accompanying drawings.

Figure 1:
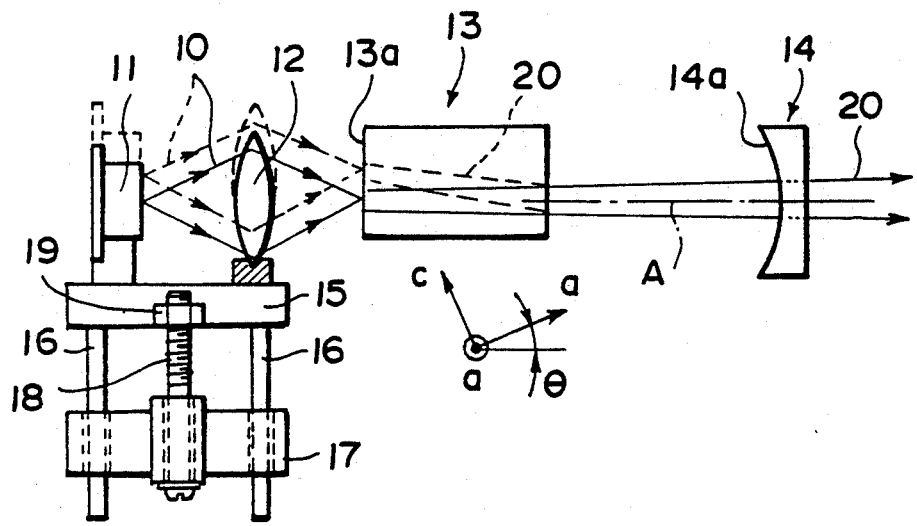
FIG. 1 is a schematic side view showing a first embodiment of the solid laser in accordance with the present invention.

FIG. 1 shows a first embodiment of the solid laser in accordance with the present invention, which is constituted as a laser diode pumped solid laser. This embodiment is provided with a semiconductor laser 11, which produces a laser beam 10 serving as a pumping beam, and a condensing lens 12, which condenses the laser beam 10 having been produced as divergent light. This embodiment is also provided with an Nd:YLF crystal 13, which is an anisotropic laser crystal, and a resonator mirror 14, which is located on the side downstream (the right side in FIG. 1) from the Nd:YLF crystal 13.

The Nd:YLF crystal 13 has been cut such that its crystallographic a-axis and c-axis makes an angle with respect to a laser oscillation axis A. The angle $\theta$ of the a-axis with respect to the laser oscillation axis A ordinarily falls within the range of 20° to 70°. The temperature of the semiconductor laser 11 is kept at a predetermined value by a Peltier device (not shown) and a temperature adjusting circuit (not shown).

The semiconductor laser 11 and the condensing lens 12, which constitute a pumping means, are secured to a common mount 15. A plurality of guide rods 16, 16, ... extending vertically in FIG. 1 are secured to the bottom surface of the mount 15. These guide rods 16, 16, ... are inserted through a holding member 17. A precision screw 18 is supported by the holding member 17 such that it can rotate. The leading end of the precision screw 18 is engaged by threads with a nut 19, which is secured to the mount 15. Therefore, when the precision screw 18 is rotated clockwise and counterclockwise, the nut 19 is moved through engagement by threads, and the mount 15 is thereby moved vertically in FIG. 1. When the mount 15 is thus moved, the semiconductor laser 11 and the condensing lens 12 move vertically in FIG. 1 with respect to the Nd:YLF crystal 13 and the resonator mirror 14.

The Nd atoms contained in the Nd:YLF crystal 13 are stimulated by the laser beam 10 having a wavelength of 795 nm, and the Nd:YLF crystal 13 thereby produces a laser beam 20 having a wavelength of 1,321 nm or 1,313 nm (as will be described later). A light entry end face 13a of the Nd:YLF crystal 13 is provided with a coating layer, which substantially transmits the pumping laser beam 10 having a wavelength of 795 nm and substantially reflects the laser beam 20 having a wavelength of 1,321 nm or 1,313 nm. Also, a mirror surface 14a of the resonator mirror 14 is provided with a coating layer, which substantially reflects the pumping laser beam 10 and transmits part of the laser beam 20. Therefore, the solid laser beam 20 resonates between the mirror surface 14a of the resonator mirror 14 and the light entry end face 13a of the Nd:YLF crystal 13, and part of the solid laser beam 20 is taken out of the resonator mirror 14.

How a beam radiation line is selected will be described hereinbelow. When the precision screw 18 is rotated and the mount 15 is thereby moved vertically, the position of incidence of the pumping laser beam 10 upon the Nd:YLF crystal 13 changes. In this embodiment, when the laser beam 10 is irradiated in the state indicated by the solid line to the Nd:YLF crystal 13, the ordinary rays oscillate, and the solid laser beam 20 having a wavelength of 1,313 nm is obtained. At this time, the laser beam 20 is constituted of the so-called $\sigma$-polarized light (having a direction of polarization, which is normal to the plane of the sheet of FIG. 1). Also, when the laser beam 10 is irradiated in the state indicated by the broken line to the Nd:YLF crystal 13, the extraordinary rays oscillate, and the solid laser beam 20 having a wavelength of 1,321 nm is obtained. At this time, the laser beam 20 is constituted of the so-called $\pi$-polarized light (having a direction of polarization, which is parallel to the plane of the sheet of FIG. 1). In the manner described above, a desired beam radiation line can be selected.

Figure 2:
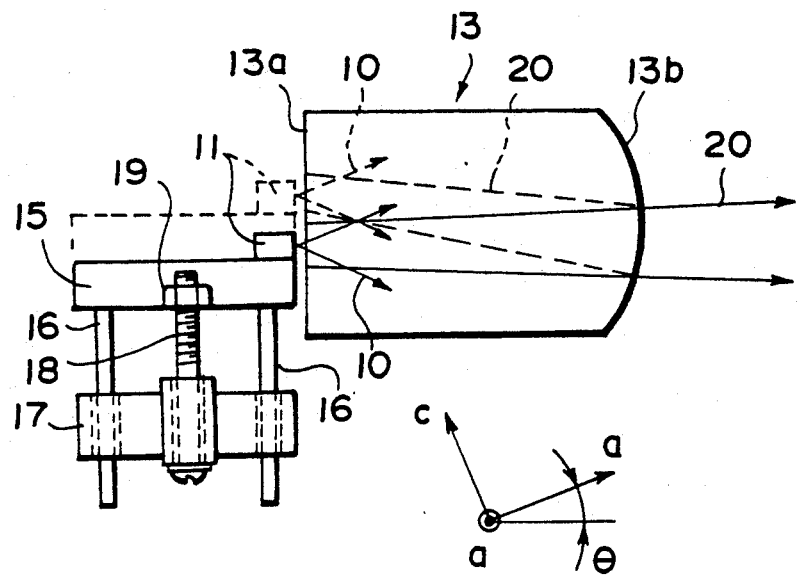
FIG. 2 is a schematic side view showing a second embodiment of the solid laser in accordance with the present invention.

FIG. 2 is a schematic side view showing a second embodiment of the solid laser in accordance with the present invention. In FIG. 2, similar elements are numbered with the same reference numerals with respect to FIG. 1. In the second embodiment, a light radiating end face 13b of an Nd:YLF crystal 13 is polished into the shape of a convex surface, which constitutes part of a spherical surface. The light entry end face 13a and the light radiating end face 13b of the Nd:YLF crystal 13 constitute resonator mirrors. The light radiating end face 13b is provided with the same coating layer as that overlaid on the mirror surface 14a of the resonator mirror 14 shown in FIG. 1.

The semiconductor laser 11 serving as the pumping means is located close to the flat light entry end face 13a of the Nd:YLF crystal 13. The semiconductor laser 11 is secured to the mount 15, which is of the same type as the mount 15 shown in FIG. 15 and can move vertically in FIG. 2 when the precision screw 18 is rotated.

In the second embodiment, when the laser beam 10 is irradiated in the state indicated by the solid line to the Nd:YLF crystal 13, the ordinary rays oscillate, and the solid laser beam 20 having a wavelength of 1,313 nm ($\sigma$-polarized light) is obtained. Also, when the laser beam 10 is irradiated in the state indicated by the broken line to the Nd:YLF crystal 13, the extraordinary rays oscillate, and the solid laser beam 20 having a wavelength of 1,321 nm ($\pi$-polarized light) is obtained.

In the first and second embodiments described above, the Nd:YLF crystal 13 is kept stationary, and the pumping means is moved. Alternatively, the pumping means may be kept stationary, and the Nd:YLF crystal 13 (and the resonator mirror 14 in the first embodiment) may be moved.

Figure 3:
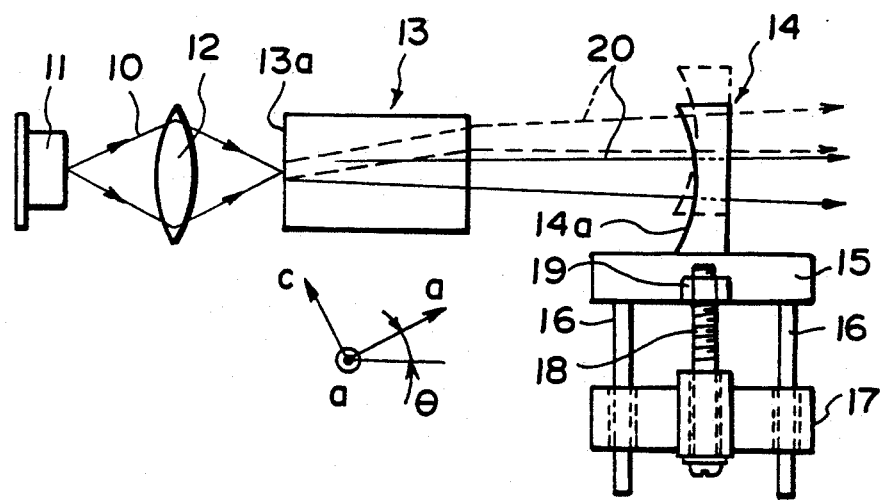
FIG. 3 is a schematic side view showing a third embodiment of the solid laser in accordance with the present invention.

A third embodiment of the solid laser in accordance with the present invention will be described hereinbelow with reference to FIG. 3. The third embodiment is identical with the first embodiment of FIG. 1, except that the semiconductor laser 11 and the condensing lens 12 are supported on a fixed mount (not shown), and that the resonator mirror 14 is secured to the mount 15, which can move vertically.

In the third embodiment, when the precision screw 18 is rotated to move the mount 15 vertically, the position of the resonator mirror 14 with respect to the positions of the semiconductor laser 11, the condensing lens 12, and the Nd:YLF crystal 13 changes. In this manner, one of the beam radiation lines of the laser beam 20 can be selected. In this embodiment, when the resonator mirror 14 is set at the position indicated by the solid line in FIG. 3, the ordinary rays oscillate, and the solid laser beam 20 having a wavelength of 1,313 nm ($\sigma$-polarized light) is obtained. Also, when the resonator mirror 14 is set at the position indicated by the broken line in FIG. 3, the extraordinary rays oscillate, and the solid laser beam 20 having a wavelength of 1,321 nm ($\pi$-polarized light) is obtained.

In the first, second, and third embodiments described above, one of the beam radiation lines in the 1.3 $\mu$m band is selected. It is also possible to select one of the beam radiation lines of the Nd:YLF crystal 13 in the 1.0 $\mu$m band, i.e. the beam radiation line, in which the laser beam having a wavelength of 1,053 nm ($\sigma$-polarized light) is obtained from oscillation of the ordinary rays, and the beam radiation line, in which the laser beam having a wavelength of 1,047 nm ($\pi$-polarized light) is obtained from oscillation of the extraordinary rays.

The solid laser in accordance with the present invention is also applicable when an anisotropic laser crystal other than Nd:YLF, e.g. Nd:MgO:LiNbO$_3$, Nd:YVO$_4$, or LNP, is employed. In such cases, the same effects as those described above can be obtained.

The solid laser in accordance with the present invention is also applicable when a crystal of a nonlinear optical material is located in the region inside of the resonator, and the solid laser beam is converted into its second harmonic, or the like.

What is claimed is:

1. A solid laser comprising:
    i) an anisotropic laser crystal, to which a rare earth element has been added,
    ii) a pumping means, which causes a pumping beam to impinge upon the laser crystal, and
    iii) a resonator mirror, which oscillates a solid laser beam having been produced by the laser crystal,
    wherein the laser crystal is located in an orientation such that a crystallographic axis thereof may makes an angle with respect to a laser oscillation axis, and a means is provided which linearly moves the pumping means with respect to the laser crystal and the resonator mirror such that only either one of ordinary rays and extraordinary rays, which are produced by the laser crystal, may oscillate selectively.

2. A solid laser as defined in claim 1 wherein said rare earth element is neodymium.

3. A solid laser as defined in claim 1 wherein said pumping means comprises a semiconductor laser.

4. A solid laser comprising:
    i) an anisotropic laser crystal, to which a rare earth element has been added,
    ii) a pumping means, which causes a pumping beam to impinge upon the laser crystal, and
    iii) a resonator mirror, which oscillates a solid laser beam having been produced by the laser crystal,
    wherein the laser crystal is located in an orientation such that a crystallographic axis thereof may makes an angle with respect to a laser oscillation axis, and a means is provided which linearly moves the resonator mirror with respect to the laser crystal and the pumping means such that only either one of ordinary rays and extraordinary rays, which are produced by the laser crystal, may oscillate selectively.

5. A solid laser as defined in claim 4 wherein said rare earth element is neodymium.

6. A solid laser as defined in claim 4 wherein said pumping means comprises a semiconductor laser.

* * * * *